(12) United States Patent
Jiang (10) Patent No.: US 11,832,120 B2
(45) Date of Patent: Nov. 28, 2023

(54) INFORMATION RECORDING METHOD AND INFORMATION RECORDING APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 194 days.

(21) Appl. No.: 16/977,752

(22) PCT Filed: Mar. 26, 2018

(86) PCT No.: PCT/CN2018/080511
§ 371 (c)(1),
(2) Date: Sep. 2, 2020

(87) PCT Pub. No.: WO2019/183761
PCT Pub. Date: Oct. 3, 2019

(65) Prior Publication Data
US 2020/0404527 A1 Dec. 24, 2020

(51) Int. Cl.
*H04W 24/10* (2009.01)
*H04W 24/08* (2009.01)
(Continued)

(52) U.S. Cl.
CPC ........... *H04W 24/10* (2013.01); *H04W 24/02* (2013.01); *H04W 24/08* (2013.01); *H04W 68/04* (2013.01); *H04W 76/27* (2018.02)

(58) Field of Classification Search
CPC ..... H04W 24/10; H04W 24/02; H04W 24/08; H04W 68/04; H04W 76/27; H04W 24/04; H04W 4/20; H04W 4/021; H04W 68/00
See application file for complete search history.

(56) References Cited

U.S. PATENT DOCUMENTS

| 2014/0057566 A1 | 2/2014 | Watfa et al. |
| 2015/0163769 A1* | 6/2015 | Lee ............ H04W 24/02 370/329 |
| 2019/0045384 A1* | 2/2019 | Zetterberg ..... H04W 36/0083 |

FOREIGN PATENT DOCUMENTS

| CN | 102123415 A | 7/2011 |
| CN | 102938905 A * | 2/2013 ........... H04W 24/10 |

(Continued)

OTHER PUBLICATIONS

State Intellectual Property Office of the People's Republic of China, Office Action and Search Report Issued in Application No. 2018800003699, dated Dec. 17, 2019, 17 pages.
(Continued)

*Primary Examiner* — Walli Z Butt
*Assistant Examiner* — Thad N Defauw
(74) *Attorney, Agent, or Firm* — Finnegan, Henderson, Farabow Garrett & Dunner, L.L.P.

(57) ABSTRACT

The present disclosure relates to an information recording method. The method is applicable to user equipment, and includes: receiving indication information from a base station, wherein the indication information includes mode indication information indicating a mode for recording Minimized Driving Test (MDT) information; and when the user equipment is in an inactive state, recording the MDT information according to the mode indication information. According to examples of the present disclosure, the user equipment may record the MDT information when it is in the inactive state, such that the user equipment transmits the MDT information recorded in the inactive state to the base
(Continued)

Receive indication information from a base station, where the indication information includes mode indication information, and the mode indication information indicates a mode for recording MDT information —S1

In response to that the user equipment is in an inactive state, record the MDT information according to the mode indication information —S2 station when the user equipment establishes or restores a communication connection with the base station later. Thus, the base station can determine various failures of the user equipment in the inactive state, thereby facilitating the base station to perform troubleshooting accurately.

17 Claims, 6 Drawing Sheets

(51) Int. Cl.
*H04W 24/02* (2009.01)
*H04W 76/27* (2018.01)
*H04W 68/04* (2009.01)

(56) References Cited

FOREIGN PATENT DOCUMENTS

| | | |
|---|---|---|
| CN | 102938905 A | 2/2013 |
| CN | 103379666 A | 10/2013 |
| CN | 104904132 A | 9/2015 |
| CN | 105594244 A | 5/2016 |
| CN | 106211204 A | 12/2016 |
| CN | 107249221 A | 10/2017 |
| EP | 2 702 790 | 3/2014 |

OTHER PUBLICATIONS

ISA State Intellectual Property Office of the People's Republic of China, International Search Report Issued in Application No. PCT/CN2018/080511, dated Dec. 29, 2018, WIPO, 6 pages.
Ericsson, New WID on Introduction of SON / MDT for NR, 3GPP TSG RAN Meeting #79, Chennai, India, RP-180462, Mar. 19-22, 2018, 4 pages.
3rd Generation Partnership Project; Technical Specification Group Radio Access Network; Evolved Universal Terrestrial Radio Access Network (E-UTRAN), X2 application protocol (X2AP) (Release 15), 3GPP TS 36.423 V15.0.0, (Dec. 2017), 350 pages.
3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description, Stage 2 (Release 14), 3GPP TS 37.320 V14.0.0, (Mar. 2017), 26 pages.
3rd Generation Partnership Project; Technical Specification Group Radio Access Network; Evolved Universal Terrestrial Radio Access (E-UTRA); Medium Access Control (MAC) protocol specification (Release 16), 3GPP TS 36.321 V16.0.0, (Mar. 2020), 141 pages.
3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.1.1, (Jul. 2020), 1073 pages.

\* cited by examiner

INFORMATION RECORDING METHOD AND INFORMATION RECORDING APPARATUS

CROSS REFERENCE TO RELATED APPLICATIONS

This application is a national phase application based on International Application No. PCT/CN2018/080511, filed Mar. 26, 2018, the content of which is incorporated herein by reference.

TECHNICAL FIELD

The present disclosure relates to the field of communication technology, and in particular, to an information recording method, an information recording apparatus, an electronic device and a computer readable storage medium.

BACKGROUND

Minimized Driving Test (MDT) technology is introduced into LTE (Long Term Evolution).

For user equipment applying the LTE, an MDT may be performed when the user equipment is in an idle state or a connected state so to record MDT information. Accordingly, the MDT information may be transmitted to a base station for troubleshooting.

Currently, the MDT information is only recorded for the user equipment in the idle state or the connected state. However, in New Radio (NR), in addition to the idle state and the connected state, the user equipment may be in an inactive state. In the related art the MDT information is not recorded for the user equipment in the inactive state, so it is not convenient for the base station to troubleshoot.

SUMMARY

In view of this, one of objectives of the present disclosure is to provide an information recording method, an information recording apparatus, an electronic device and a computer readable storage medium.

According to a first aspect of examples of the present disclosure, there is provided an information recording method. The method is applicable to user equipment, and includes:

receiving indication information from a base station, where the indication information includes mode indication information indicating a mode for recording MDT information; and in response to that the user equipment is in an inactive state, recording the MDT information according to the mode indication information.

Optionally, the indication information further includes state indication information indicating a preset state in which the user equipment is enabled to record the MDT information; and the method further includes:

determining a state included in the preset state, where in response to that the user equipment is in the inactive state, recording the MDT information according to the mode indication information includes:

in response to that the preset state includes the inactive state and the user equipment is in the inactive state, recording the MDT information according to the mode indication information.

Optionally, the indication information further includes first identification information indicating a preset radio access network notification area; and where in response to that the preset state includes the inactive state and the user equipment is in the inactive state, recording the MDT information according to the mode indication information includes:

in response to that the preset state includes the inactive state and the user equipment in the inactive state is located in the preset radio access network notification area, recording the MDT information according to the mode indication information.

Optionally, the method further includes:

in response to that the preset state includes an idle state and the user equipment is in the idle state, recording the MDT information according to the mode indication information.

Optionally, the indication information further includes second identification information indicating a preset cell; and where in response to that the user equipment is in the inactive state, recording the MDT information according to the mode indication information includes:

in response to that the user equipment in the inactive state is located in the preset cell, recording the MDT information according to the mode indication information.

Optionally, the indication information further includes third identification information indicating a preset tracing area; and where in response to that the user equipment is in the inactive state, recording the MDT information according to the mode indication information includes:

in response to that the user equipment in the inactive state is located in the preset tracing area, recording the MDT information according to the mode indication information.

Optionally, the mode indication information indicates at least one of: a duration of each MDT-information-recording, or a time interval between adjacent MDT-information-recordings.

Optionally, the method further includes:

in response to that a communication connection with the base station is established or restored, transmitting a notification to the base station, where the notification indicates that there is the MDT information in the user equipment;

receiving a request for acquiring the MDT information from the base station; and transmitting the MDT information to the base station.

Optionally, the MDT information includes state information indicating that the user equipment is in an idle state or in the inactive state.

According to a second aspect of the examples of the present disclosure, there is provided an information recording apparatus. The apparatus is applicable to user equipment, and includes:

an indication receiving module configured to receive indication information from a base station, where the indication information includes mode indication information indicating a mode for recording MDT information; and an information recording module configured to, in response to that the user equipment is in an inactive state, record the MDT information according to the mode indication information.

Optionally, the indication information further includes state indication information indicating that a preset state in which the user equipment is enabled to record the MDT information; the apparatus further includes:

a state determining module configured to determine whether the preset state includes a state included in the inactive state; and where the information recording module is configured to, in response to that the preset state includes the inactive state and the user equipment is in the inactive state, record the MDT information according to the mode indication information.

optionally, the indication information further includes first identification information indicating a preset radio access network notification area; and where the information recording module is configured to, in response to that the preset state includes the inactive state and the user equipment in the inactive state is located in the preset radio access network notification area, record the MDT information according to the mode indication information.

Optionally, the information recording module is further configured to, in response to that the preset state includes an idle state and the user equipment is in the idle state, record the MDT information according to the mode indication information.

Optionally, the indication information further includes second identification information indicating a preset cell; and where the information recording module is configured to, in response to that the user equipment in the inactive state is located in the preset cell, record the MDT information according to the mode indication information.

Optionally, the indication information further includes third identification information indicating a preset tracing area; and where the information recording module is configured to, in response to that the user equipment in the inactive state is located in the preset tracing area, record the MDT information according to the mode indication information.

Optionally, the mode indication information indicates at least one of: a duration of each MDT-information-recording, or a time interval between adjacent MDT-information-recordings.

Optionally, the apparatus further includes:

a notification transmitting module configured to, in response to that a communication connection with the base station is established or restored, transmit a notification to the base station, where the notification indicates that there is the MDT information in the user equipment;

a request receiving module configured to receive a request for acquiring the MDT information from the base station; and an information transmitting module configured to transmit the MDT information to the base station.

Optionally, the MDT information includes state information indicating that the user equipment is in an idle state or in the inactive state.

According to a third aspect of the examples of the present disclosure, there is provided an electronic device. The device is applicable to user equipment, and includes:

a processor; and a memory for storing instructions executable by the processor, where the processor is configured to:

receive indication information from a base station, where the indication information includes mode indication information indicating a mode for recording MDT information; and in response to that the user equipment is in an inactive state, record the MDT information according to the mode indication information.

According to a fourth aspect of the examples of the present disclosure, there is provided a computer readable storage medium storing a computer program, where the storage medium is applicable to user equipment, and the program is executed by a processor to perform:

receiving indication information from a base station, where the indication information includes mode indication information indicating a mode for recording MDT information; and in response to that the user equipment is in an inactive state, recording the MDT information according to the mode indication information.

According to examples of the present disclosure, the user equipment may record MDT information when it is in the inactive state, so that the user equipment, when establishing or restoring a communication connection with the base station subsequently, will transmit the MDT information recorded in the inactive state to the base station, and accordingly, the base station can determine various failures of the user equipment in the inactive state, which is convenient for the base station to perform troubleshooting accurately.

BRIEF DESCRIPTION OF THE DRAWINGS

To more clearly explain the technical solutions in the embodiments of the present application, the drawings required in describing the embodiments will be briefly described below. Obviously, the drawings in the following description are only some embodiments of the present application. And a person of ordinary skill in the art can obtain other drawings based on these drawings without paying any creative effort.

DETAILED DESCRIPTION OF THE EMBODIMENTS

The technical solutions in the examples of the present application will be described clearly and completely in conjunction with the drawings thereof. Apparently, the described examples are only a part but not all of the examples of the present application. Based on the examples of the present application, all other examples obtained by those of ordinary skill in the art without creative work shall fall within the protection scope of this application.

Figure 1:
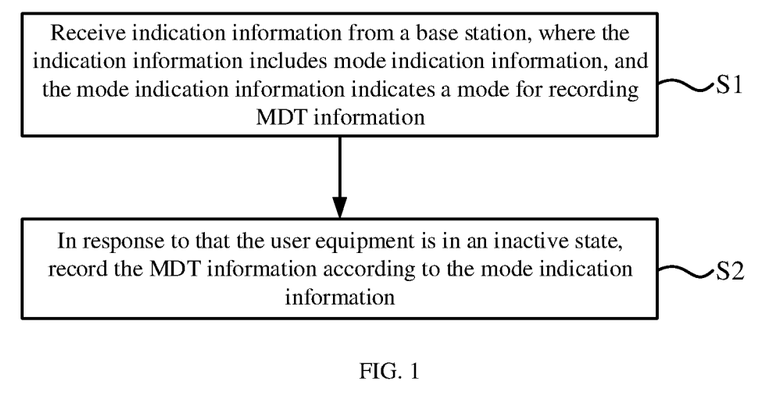
FIG. 1 is a schematic flowchart illustrating an information recording method according to an example of the present disclosure.

FIG. 1 is a schematic flowchart illustrating an information recording method according to an example of the present disclosure. The information recording method shown in this example may be applicable to user equipment, such as a mobile phone, a tablet computer, and so on. The user equipment may use LTE or NR for communication.

As shown in FIG. 1, the information recording method may include the following steps.

At step S1, indication information from a base station is received, where the indication information includes mode indication information, and the mode indication information indicates a mode for recording MDT information.

In an example, a base station may communicate with the user equipment using LTE or NR.

In an example, the base station may send the indication information to the user equipment during establishing or restoring a communication connection with the user equipment. Alternatively, the base station may send the indication information to the user equipment at other times, for example, when receiving, from the user equipment, a request for obtaining the indication information.

In an example, the mode indication information may include a duration of each MDT-information-recording and/or a time interval between adjacent MDT-information-recording.

At step S2, in response to that the user equipment is in an inactive state, the MDT information is recorded according to the mode indication information.

In an example, the mode indication information indicates that the duration of each MDT-information-recording is 1 second, and the time interval between adjacent MDT-information-recordings is 5 seconds, then the user equipment may record the MDT information while in the inactive state, each MDT-information-recording lasts 1 second, and an end of a present MDT-information-recording is separated by 5 seconds from a start of a next MDT-information-recording adjacent to the present MDT-information-recording.

According to examples of the present disclosure, the user equipment may record the MDT information when the user equipment is in the inactive state, such that the user equipment will transmit the MDT information recorded in the inactive state to the base station when the user equipment establishes or restores a communication connection with the base station later. Thus, the base station can determine various failures of the user equipment in the inactive state, thereby facilitating the base station to perform troubleshooting accurately.

For example, when the user equipment in the inactive state fails to request establishment of a communication connection from the base station, the MDT information may be used to record contents, such as, a cell in which the user equipment is located, a signal quality of the cell in which the user equipment is located, a signal quality of a neighborhood cell of the cell in which the user equipment is located, a number of times of sending a random access preamble, and so on. The base station, according to these contents in the MDT information, may determine a reason (e.g., low signal quality of the cell in which the user equipment is located) for the failure of requesting the establishment of the communication connection by the user equipment in the inactive state, thereby performing troubleshooting accurately.

Figure 2:
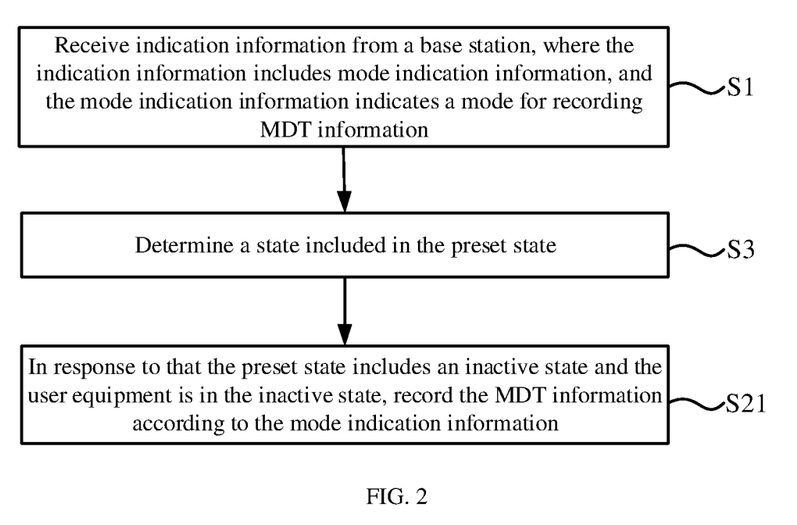
FIG. 2 is a schematic flowchart illustrating another information recording method according to an example of the present disclosure.

FIG. 2 is a schematic flowchart illustrating another information recording method according to an example of the present disclosure. As shown in FIG. 2, on the basis of the example shown in FIG. 1, the indication information further includes state indication information, and the state indication information indicates a preset state in which the user equipment is enabled to record the MDT information. The method further includes the following.

At step S3, a state included in the preset state is determined.

In an example, the preset state is included in the state indication information. The preset state may include at least one of the following states: the inactive state, an idle state or a connected state. Which one/ones of the three states is/are specifically included may be set on a base station side as required.

In response to that the user equipment is in an inactive state, recording the MDT information according to the mode indication information includes the following.

At step S21, in response to that the preset state includes the inactive state and the user equipment is in the inactive state, the MDT information is recorded according to the mode indication information.

In an example, the state indication information is set to indicate the user equipment being capable of recording the MDT information while the user equipment is in the preset state. The preset state may be set as needed, that is, the user equipment may be indicated to record the MDT information when the user equipment in a particular state according to needs. For example, if the preset state includes the inactive state, the user equipment may record the MDT information when it is in the inactive state. Thus, it is ensured that subsequently the base station will receive the MDT information recorded by the user equipment only in a desired state and the received information is more purposeful, and a waste of resources due to reception of unnecessary information is avoided.

Figure 3:
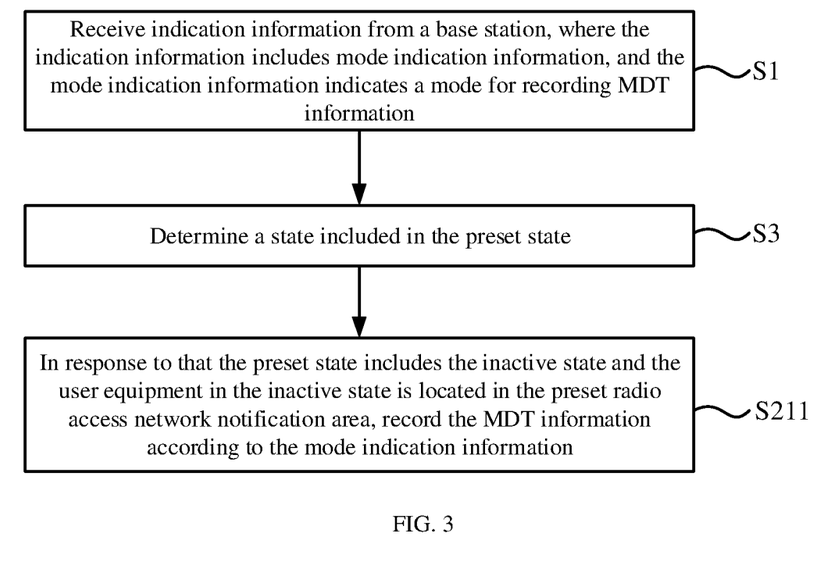
FIG. 3 is a schematic flowchart illustrating still another information recording method according to an example of the present disclosure.

FIG. 3 is a schematic flowchart illustrating still another information recording method according to an example of the present disclosure. As shown in FIG. 3, on the basis of the example shown in FIG. 2, the indication information further includes first identification information, and the first identification information indicates a preset radio access network notification area.

In response to that the preset state includes the inactive state and the user equipment is in the inactive state, recording the MDT information according to the mode indication information includes the following.

At step S211, in response to that the preset state includes the inactive state and the user equipment in the inactive state is located in the preset radio access network notification area, the MDT information is recorded according to the mode indication information.

In an example, the radio access network is also abbreviated as RAN. The first identification information may be an identifier of the preset radio access network notification area. It should be noted that the first identification information may include one identifier or a plurality of identifiers. One identifier may indicate one preset radio access network notification area or multiple preset radio access network notification areas. Alternatively, a plurality of identifiers may indicate multiple preset radio access network notification areas.

In an example, the preset radio access network notification area is indicated by setting the first identification information. The first identification information may be set as needed, that is, the user equipment may be indicated to record the MDT information when the user equipment is in one or more particular radio access network notification areas according to needs. Thus, the user equipment may record the MDT information when the user equipment is in the inactive state and located in the preset radio access network notification area indicated by the first identification information, thereby ensuring that subsequently the base station will receive the MDT information recorded by the user equipment only in a desired radio access network notification area and the received information is more purposeful, and avoiding a waste of resources due to reception of unnecessary information.

Figure 4:
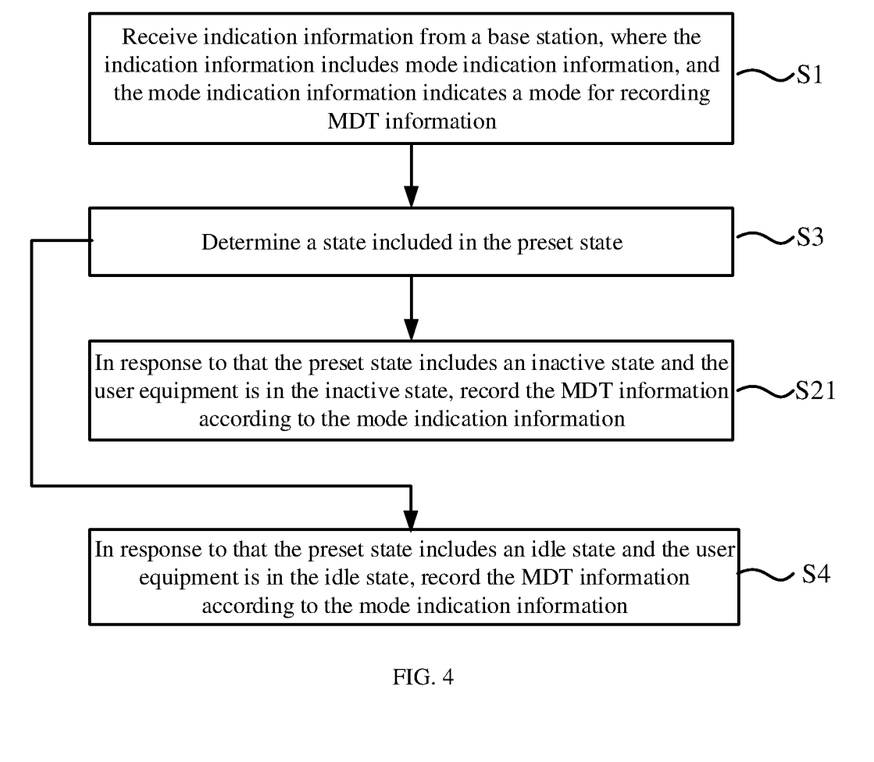
FIG. 4 is a schematic flowchart illustrating still another information recording method according to an example of the present disclosure.

FIG. 4 is a schematic flowchart illustrating still another information recording method according to an example of the present disclosure. As shown in FIG. 4, on the basis of the example shown in FIG. 2, the information recording method further includes the following.

At step S4, in response to that the preset state includes an idle state, when the user equipment is in the idle state, the MDT information is recorded according to the mode indication information.

In an example, corresponding to the example shown in FIG. 2, the preset state may include the idle state. The preset state may include only the inactive state or only the idle state. Based on this example, the user equipment may be configured to record the MDT information when the user equipment is in the idle state, thereby ensuring that subsequently the base station will receive the MDT information recorded by the user equipment only in a desired state and the received information is more purposeful, and avoiding a waste of resources due to reception of unnecessary information. The preset state may also include both the inactive state and the idle state. Based on this example, the user equipment may be configured to record the MDT information when the user equipment is in the idle state or inactive state, thereby ensuring that subsequently the base station will receive the MDT information recorded by the user equipment only in the desired state and the received information is more purposeful, and avoiding the waste of resources due to the reception of unnecessary information.

It should be noted that the preset state may include the inactive state as described in the example shown in FIG. 2, or the idle state as described in the example shown in FIG. 4. The preset state may also include another state such as a connected state.

In addition, the MDT information recorded by the user equipment in the inactive state may be different with that recorded in the idle state or the connected state. For example, the MDT information recorded by the user equipment in the inactive state may include change information of radio access network notification area in which the user equipment is located. The MDT information recorded by the user equipment in the idle state or the connected state may not include the change information of the radio access network notification area in which the user equipment is located.

Figure 5:
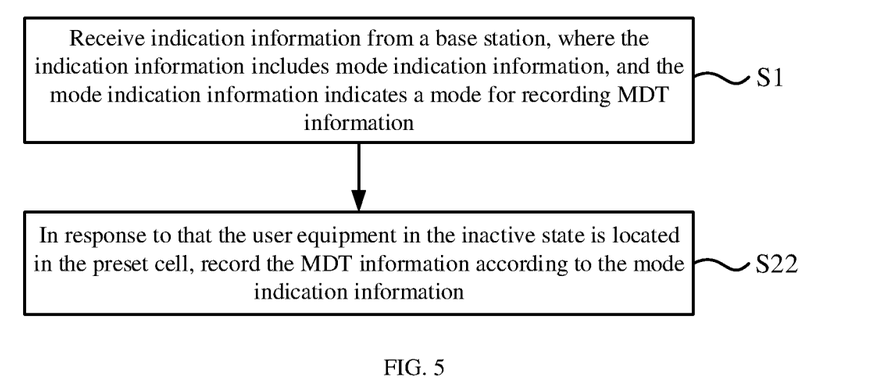
FIG. 5 is a schematic flowchart illustrating still another information recording method according to an example of the present disclosure.

FIG. 5 is a schematic flowchart illustrating still another information recording method according to an example of the present disclosure. As shown in FIG. 5, on the basis of the example shown in FIG. 1, the indication information further includes second identification information, and the second identification information indicates a preset cell.

In response to that the user equipment is in an inactive state, recording the MDT information according to the mode indication information includes the following.

At step S22, in response to that the user equipment in the inactive state is located in the preset cell, the MDT information is recorded according to the mode indication information.

In an example, the second identification information may be an identifier of the preset cell. The second identification information may include one identifier or a plurality of identifiers. One identifier may indicate one preset cell or multiple preset cells. Alternatively, a plurality of identifiers may indicate multiple preset cells.

In an example, the preset cell is indicated by setting the second identification information. The second identification information may be set as needed, that is, the user equipment may be indicated to record the MDT information when the user equipment is in one or more particular cells according to needs. Thus, the user equipment may record the MDT information when user equipment is in the inactive state and located in the preset cell indicated by the second identification information, thereby ensuring that subsequently the base station will receive the MDT information recorded by the user equipment only in a desired cell and the received information is more purposeful, and avoiding a waste of resources due to reception of unnecessary information.

Figure 6:
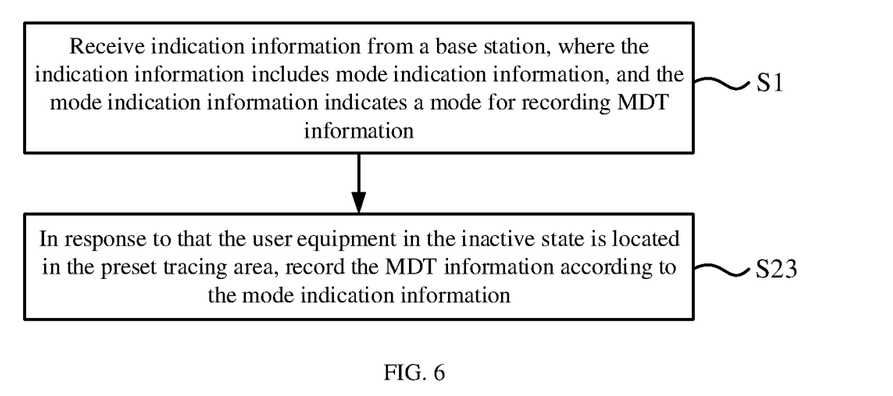
FIG. 6 is a schematic flowchart illustrating still another information recording method according to an example of the present disclosure.

FIG. 6 is a schematic flowchart illustrating still another information recording method according to an example of the present disclosure. As shown in FIG. 6, on the basis of the example shown in FIG. 1, the indication information further includes third identification information, and the third identification information indicates a preset tracing area.

In response to that the user equipment is in an inactive state, recording the MDT information according to the mode indication information includes the following.

At step S23, in response to that the user equipment in the inactive state is located in the preset tracing area, the MDT information is recorded according to the mode indication information.

In an example, the third identification information may be an identifier of the preset tracing area. The third identification information may include one identifier or a plurality of identifiers. One identifier may indicate one preset tracing area or multiple preset tracing areas. Alternatively, a plurality of identifiers may indicate multiple preset tracing areas.

In an example, the preset tracing area is indicated by setting the third identification information. The third identification information may be set as needed, the user equipment may be indicated to record the MDT information when the user equipment is in one or more particular tracing areas according to needs. Thus, the user equipment may record the MDT information when the user equipment is in the inactive state and located in the preset tracing area indicated by the third identification information, thereby ensuring that subsequently the base station will receive the MDT information recorded by the user equipment only in a desired tracing area and the received information is more purposeful, and avoiding a waste of resources due to reception of unnecessary information.

Optionally, the mode indication information indicates a duration of each MDT-information-recording and/or a time interval between adjacent MDT-information-recordings.

In an example, the mode indication information indicates that the duration of each MDT-information-recording is 1 second, and the time interval between adjacent MDT-information-recordings is 5 seconds, then the user equipment may record the MDT information while in the inactive state, each MDT-information-recording lasts 1 second, and an end of a present MDT-information-recording is separated by 5 seconds from a start of a next MDT-information-recording adjacent to the present MDT-information-recording.

It should be noted that the mode indication information may also indicate other contents, such as a number of MDT-information-recordings by the user equipment, a total duration of MDT-information-recordings by the user equipment, and so on.

Figure 7:
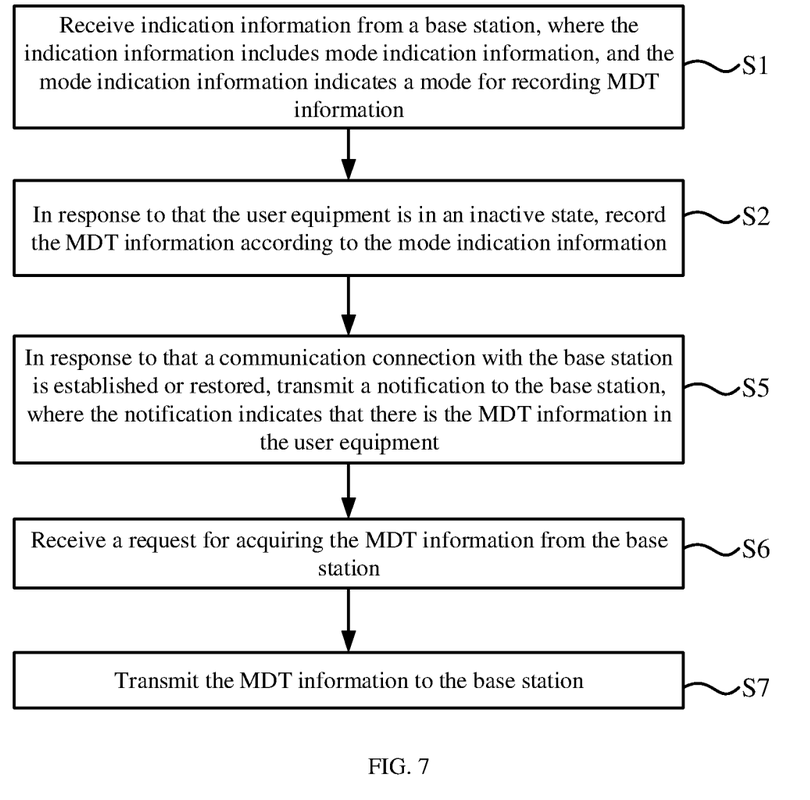
FIG. 7 is a schematic flowchart illustrating still another information recording method according to an example of the present disclosure.

FIG. 7 is a schematic flowchart illustrating still another information recording method according to an example of the present disclosure. As shown in FIG. 7, on the basis of the example shown in FIG. 1, the information recording method further includes the followings.

At step S5, in response to that a communication connection with the base station is established or restored, a notification is transmitted to the base station, where the notification indicates that there is the MDT information in the user equipment.

At step S6, a request for acquiring the MDT information is received from the base station.

At step S7, the MDT information is transmitted to the base station.

In an example, as the MDT information is recorded (e.g., a number of MDT-information-recordings by the user equipment reaches a preset number), when establishing or restoring the communication connection with the base station, the user equipment may send a notification to the base station to inform the base station that the user equipment has recorded the MDT information.

When the base station is to acquire the MDT information recorded by the user equipment, the base station may send a request for acquiring the MDT information to the user equipment, and then the user equipment may transmit the recorded MDT information to the base station. Thus, the base station may analyze a failure of the user equipment in the inactive state according to the MDT information. For example, when analyzing a reason for a failure of requesting establishment of a communication connection by the user equipment in the inactive state, the base station may analyze a signal quality of a cell in which the user equipment is located in the inactive state in the MDT information to determine whether the reason for the failure was due to a low signal quality.

Optionally, the MDT information includes state information, and the state information indicates that the user equipment is in the idle state or in the inactive state.

In an example, the MDT information recorded by the user equipment may also include state information. According to the state information, the base station may determine which state the user equipment is in (for example, the idle state or the inactive state) when recording the MDT information. Causes of user equipment failures may be different in the idle state and the inactive state. For example, when the user equipment is in the idle state, it is unnecessary to inform the base station about change information of a radio access network notification area in which the user equipment is located. When the user equipment is in the inactive state, it is necessary to inform the base station about the change information of the radio access network notification area in which the user equipment is located.

Therefore, informing the base station of the state in which the user equipment records the MDT information facilitates the base station to extract data for troubleshooting from the MDT information according to the state in which the user equipment records the MDT information. For example, for the user equipment in the inactive state, the change information of the radio access network notification area may be extracted from the MDT information, while for the user equipment in the idle state, there is no need to extract the change information of the radio access network notification area from the MDT information.

It should be noted that, in addition to the idle state or the inactive state, the state information may indicate that the user equipment is in the connected state.

Corresponding to the information recording method examples, the present disclosure also provides information recording apparatus examples.

Figure 8:
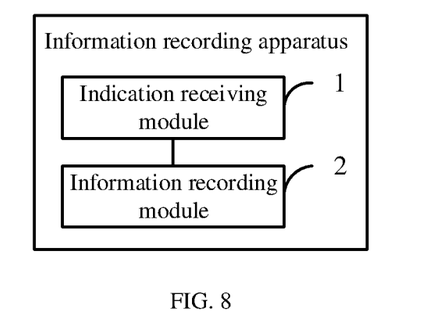
FIG. 8 is a schematic block diagram illustrating an information recording apparatus according to an example of the present disclosure.

FIG. 8 is a schematic block diagram illustrating an information recording apparatus according to an example of the present disclosure. The information recording apparatus shown in this example may be applicable to user equipment, such as a mobile phone, a tablet computer, and so on. The user equipment may use LTE or NR for communication.

As shown in FIG. 8, the information recording apparatus may include the following modules.

An indication receiving module 1 is configured to receive indication information from a base station, where the indication information includes mode indication information indicating a mode for recording MDT information.

An information recording module 2 is configured to, in response to that the user equipment is in an inactive state, record the MDT information according to the mode indication information.

Figure 9:
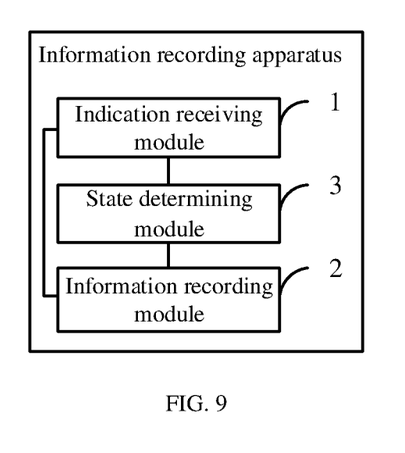
FIG. 9 is a schematic block diagram illustrating another information recording apparatus according to an example of the present disclosure.

FIG. 9 is a schematic block diagram illustrating another information recording apparatus according to an example of the present disclosure. As shown in FIG. 9, on the basis of the example shown in FIG. 8, the indication information further includes state indication information indicating that a preset state in which the user equipment is enabled to record the MDT information. The apparatus further includes the following.

A state determining module 3 is configured to determine whether the preset state includes a state included in the inactive state.

The information recording module is configured to, in response to that the preset state includes the inactive state and the user equipment is in the inactive state, record the MDT information according to the mode indication information.

Optionally, the indication information further includes first identification information indicating a preset radio access network notification area.

The information recording module is configured to, in response to that the preset state includes the inactive state and the user equipment in the inactive state is located in the preset radio access network notification area, record the MDT information according to the mode indication information.

Optionally, the information recording module is further configured to, in response to that the preset state includes an idle state and the user equipment is in the idle state, record the MDT information according to the mode indication information.

Optionally, the indication information further includes second identification information indicating a preset cell.

The information recording module is configured to, in response to that the user equipment in the inactive state is located in the preset cell, record the MDT information according to the mode indication information.

Optionally, the indication information further includes third identification information indicating a preset tracing area.

The information recording module is configured to, in response to that the user equipment in the inactive state is located in the preset tracing area, record the MDT information according to the mode indication information.

Optionally, the mode indication information indicates a duration of each MDT-information-recording and/or a time interval between adjacent MDT-information-recordings.

Figure 10:
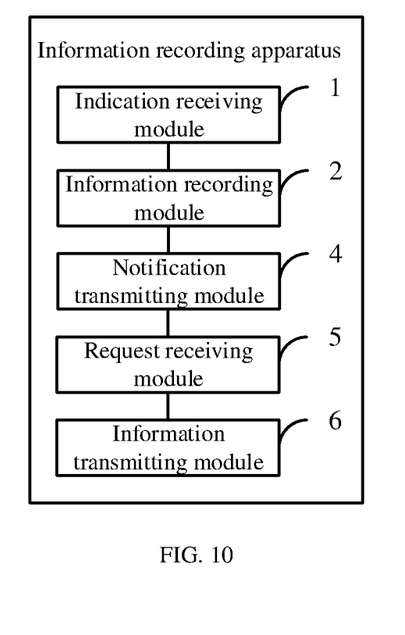
FIG. 10 is a schematic block diagram illustrating still another information recording apparatus according to an example of the present disclosure.

FIG. 10 is a schematic block diagram illustrating another information recording apparatus according to an example of the present disclosure. As shown in FIG. 10, on the basis of the example shown in FIG. 8, the information recording apparatus further includes the followings.

A notification transmitting module 4 is configured to, in response to that a communication connection with the base station is established or restored, transmit a notification to the base station, where the notification indicates that there is the MDT information in the user equipment.

A request receiving module 5 is configured to receive a request for acquiring the MDT information from the base station.

An information transmitting module 6 is configured to transmit the MDT information to the base station.

Optionally, the MDT information includes state information indicating that the user equipment is in an idle state or in the inactive state.

Regarding the apparatuses in the above examples, the specific manner for each module to perform operations has been described in detail in related method examples, and will not be elaborated here.

For the apparatus examples, since they basically correspond to the method examples, reference may be made to the partial description of the method examples. The apparatus examples described above are merely illustrative, where the modules described as separate components may or may not be physically separated, and the components displayed as modules may or may not be physical modules, i.e., may be located in one place or may be distributed to multiple network modules. Some or all of the modules may be selected according to actual needs to achieve the objectives of the present disclosure. Those of ordinary skill in the art can understand and implement the present disclosure without any creative effort.

An example of the present disclosure further provides an electronic device. The device is applicable to user equipment, and includes:

a processor; and a memory for storing instructions executable by the processor, where the processor is configured to:

receive indication information from a base station, where the indication information includes mode indication information indicating a mode for recording MDT information; and in response to that the user equipment is in an inactive state, record the MDT information according to the mode indication information.

An example of the present disclosure further provides a computer readable storage medium storing a computer program, where the storage medium is applicable to user equipment, and the program is executed by a processor to perform the following steps:

receiving indication information from a base station, where the indication information includes mode indication information indicating a mode for recording MDT information; and in response to that the user equipment is in an inactive state, recording the MDT information according to the mode indication information.

Figure 11:
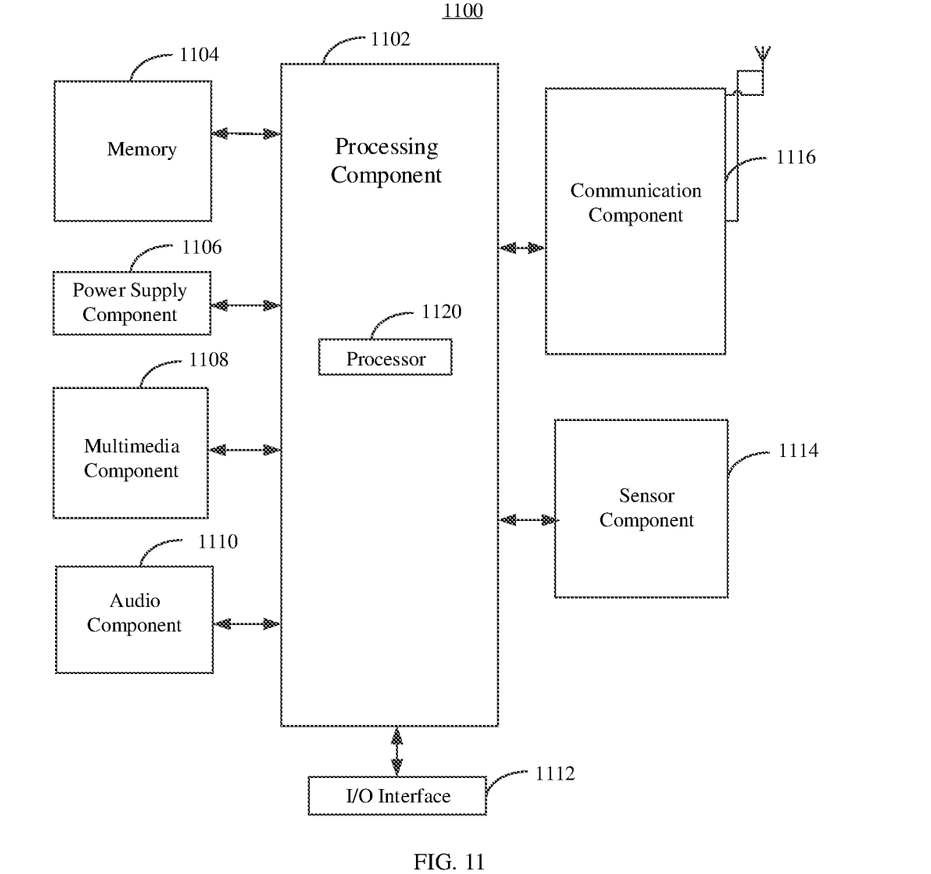
FIG. 11 is a schematic block diagram illustrating an apparatus suitable for recording information according to an example of the present disclosure.

FIG. 11 is a schematic block diagram illustrating an apparatus 1100 suitable for recording information according to an example of the present disclosure. For example, the apparatus 1100 may be a mobile phone, a computer, a digital broadcast terminal, a messaging device, a game console, a tablet device, a medical equipment, a fitness equipment, a personal digital assistant, etc.

Referring to FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114, and a communication component 1116.

The processing component 1102 usually controls the overall operation of the apparatus 1100, such as operations associated with display, telephone calls, data communications, camera operations, and recording operations. The processing component 1102 may include one or more processors 1120 to execute instructions to perform all or part of the steps in the methods described above. Moreover, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operation at the apparatus 1100. Examples of these data include instructions for any application or method operating at the apparatus 1100, contact data, phone book data, messages, pictures, videos, and the like. The memory 1104 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power supply component 1106 provides power to various components of the apparatus 1100. The power supply component 1106 may include a power management system, one or more power sources, and other components associated with power generated, managed, and distributed for the apparatus 1100.

The multimedia component 1108 includes a screen that provides an output interface between the apparatus 1100 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1108 includes a front camera and/or a rear camera. When the apparatus 1100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some examples, the audio component 1110 also includes a loudspeaker for outputting an audio signal.

The I/O interface 1112 provides an interface between the processing component 1102 and a peripheral interface module which may be a keyboard, a click wheel, a button, or the like. These buttons may include, but are not limited to a home button, a volume button, a start button, and a lock button.

The sensor component 1114 includes one or more sensors for providing a status assessment in various aspects to the apparatus 1100. For example, the sensor component 1114 may detect an open/closed state of the apparatus 1100, and the relative positioning of components, for example, the component is a display and a keypad of the apparatus 1100. The sensor component 1114 may also detect a change in position of the apparatus 1100 or a component of the apparatus 1100, the presence or absence of a user in contact with the apparatus 1100, the orientation or acceleration/deceleration of the apparatus 1100 and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some examples, the sensor component 1114 may also include an acceleration sensor, a gyro sensor, a magnetic sensor, a pressure sensor, or a temperature sensor.

The communication component 1116 is configured to facilitate wired or wireless communication between the apparatus 1100 and other devices. The apparatus 1100 may access a wireless network based on a communication standard, such as WiFi, 2G or 3G, or a combination thereof. In an example, the communication component 1116 receives broadcast signals or broadcast associated information from an external broadcast management system via a broadcast channel In an example, the communication component 1116 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1100 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the information recording method according to any of the above examples.

In an example, there is also provided a non-transitory computer readable storage medium including instructions, such as a memory 1104 including instructions, where the instructions are executable by the processor 1120 of the apparatus 1100 to perform the method as described above. For example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. An information recording method, being applicable to user equipment, and comprising:
receiving indication information from a base station, wherein the indication information comprises mode indication information indicating a mode for recording Minimized Driving Test (MDT) information; and
in response to that the user equipment is in an inactive state, recording the MDT information according to the mode indication information, wherein the MDT information comprises state information indicating that the user equipment is in an inactive state, and the MDT information recorded by the user equipment in the inactive state includes change information of radio access network notification area in which the user equipment is located; and
in response to that the user equipment is in an idle state, recording the MDT information according to the mode indication information, wherein the MDT information comprises state information indicating that the user equipment is in an idle state, and the MDT information recorded by the user equipment in the idle state does not include the change information of the radio access network notification area in which the user equipment is located.

2. The method according to claim 1, wherein the indication information further comprises state indication information indicating a preset state in which the user equipment is enabled to record the MDT information;
the method further comprising:
determining a state comprised in the preset state; and
wherein in response to that the user equipment is in the inactive state, recording the MDT information according to the mode indication information comprises:
in response to that the preset state comprises the inactive state and the user equipment is in the inactive state, recording the MDT information according to the mode indication information.

3. The method according to claim 1, wherein the indication information further comprises second identification information indicating a preset cell; and
wherein in response to that the user equipment is in the inactive state, recording the MDT information according to the mode indication information comprises:
in response to that the user equipment in the inactive state is located in the preset cell, recording the MDT information according to the mode indication information.

4. The method according to claim 1, wherein the indication information further comprises third identification information indicating a preset tracing area; and
wherein in response to that the user equipment is in the inactive state, recording the MDT information according to the mode indication information comprises:
in response to that the user equipment in the inactive state is located in the preset tracing area, recording the MDT information according to the mode indication information.

5. The method according to claim 1, wherein the mode indication information indicates at least one of:
a duration of each MDT-information-recording, or
a time interval between adjacent MDT-information-recordings.

6. The method according to claim 1, further comprising:
in response to that a communication connection with the base station is established or restored, transmitting a notification to the base station, wherein the notification indicates that there is the MDT information in the user equipment;
receiving a request for acquiring the MDT information from the base station; and
transmitting the MDT information to the base station.

7. The method according to claim 2, wherein the indication information further comprises first identification information indicating a preset radio access network notification area; and
wherein in response to that the preset state comprises the inactive state and the user equipment is in the inactive state, recording the MDT information according to the mode indication information comprises:
in response to that the preset state comprises the inactive state and the user equipment in the inactive state is located in the preset radio access network notification area, recording the MDT information according to the mode indication information.

8. The method according to claim 2, further comprising:
in response to that the preset state comprises an idle state and the user equipment is in the idle state, recording the MDT information according to the mode indication information.

9. User equipment, comprising:
a processor; and
a memory storing instructions executable by the processor;
wherein the processor is configured to:
receive indication information from a base station, wherein the indication information comprises mode indication information indicating a mode for recording Minimized Driving Test (MDT) information; and
in response to that the user equipment is in an inactive state, record the MDT information according to the mode indication information, wherein the MDT information comprises state information indicating that the user equipment is in an inactive state, and the MDT information recorded by the user equipment in the inactive state includes chance information of radio access network notification area in which the user equipment is located; and
in response to that the user equipment is in an idle state, recording the MDT information according to the mode indication information, wherein the MDT information comprises state information indicating that the user equipment is in an idle state, and the MDT information recorded by the user equipment in the idle state does not include the change information of the radio access network notification area in which the user equipment is located.

10. The user equipment according to claim 9, wherein the indication information further comprises state indication information indicating that a preset state in which the user equipment is enabled to record the MDT information;
the processor is further configured to:
determine a state comprised in the preset state; and
in response to that the preset state comprises the inactive state and the user equipment is in the inactive state, record the MDT information according to the mode indication information.

11. The user equipment according to claim 9, wherein the indication information further comprises second identification information indicating a preset cell; and
wherein the processor is further configured to, in response to that the user equipment in the inactive state is located in the preset cell, record the MDT information according to the mode indication information.

12. The user equipment according to claim 9, wherein the indication information further comprises third identification information indicating a preset tracing area; and
wherein the processor is further configured to, in response to that the user equipment in the inactive state is located in the preset tracing area, record the MDT information according to the mode indication information.

13. The user equipment according to claim 9, wherein the mode indication information indicates at least one of:
a duration of each MDT-information-recording, or
a time interval between adjacent MDT-information-recordings.

14. The user equipment according to claim 9, wherein the processor is further configured to:
in response to that a communication connection with the base station is established or restored, transmit a notification to the base station, wherein the notification indicates that there is the MDT information in the user equipment;
receive a request for acquiring the MDT information from the base station; and
transmit the MDT information to the base station.

15. The user equipment according to claim 10, wherein the indication information further comprises first identification information indicating a preset radio access network notification area; and     wherein the processor is further configured to, in response to that the preset state comprises the inactive state and the user equipment in the inactive state is located in the preset radio access network notification area, record the MDT information according to the mode indication information.

16. The user equipment according to claim 10, wherein the processor is further configured to, in response to that the preset state comprises an idle state and the user equipment is in the idle state, record the MDT information according to the mode indication information.

17. A non-transitory computer readable storage medium storing a computer program that, when executed by a processor of user equipment, causes the user equipment to perform:

receiving indication information from a base station, wherein the indication information comprises mode indication information indicating a mode for recording Minimized Driving Test (MDT) information; and in response to that the user equipment is in an inactive state, recording the MDT information according to the mode indication information, wherein the MDT information comprises state information indicating that the user equipment is in an inactive state, and the MDT information recorded by the user equipment in the inactive state includes change information of radio access network notification area in which the user equipment is located; and in response to that the user equipment is in an idle state, recording the MDT information according to the mode indication information, wherein the MDT information comprises state information indicating that the user equipment is in an idle state, and the MDT information recorded by the user equipment in the idle state does not include the change information of the radio access network notification area in which the user equipment is located.

\* \* \* \* \*